Jan. 1, 1924
W. N. GREEN
BELT CLEANER
Filed March 3, 1923
1,479,176
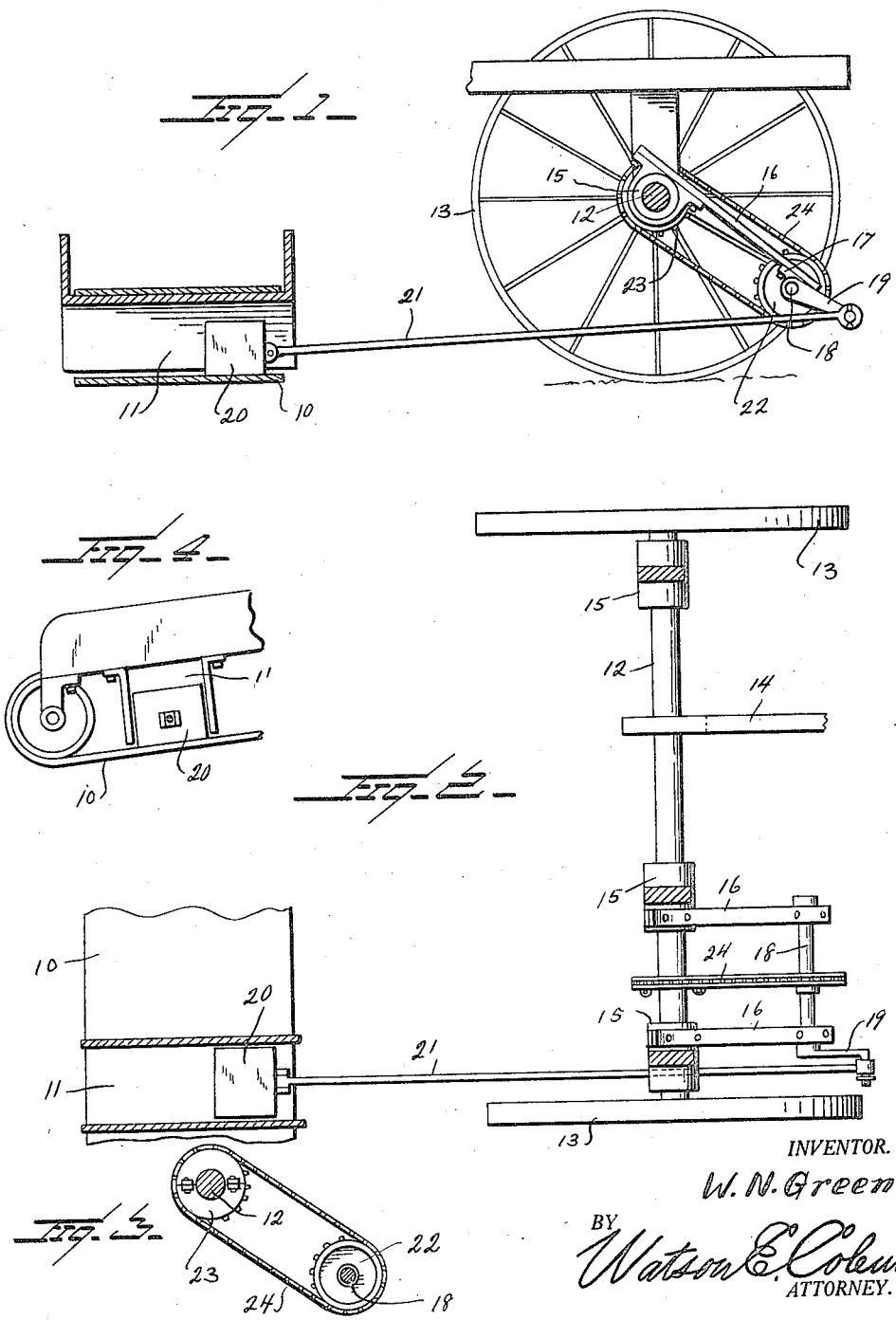
INVENTOR.
W. N. Green
BY
Watson E. Coleman
ATTORNEY.

Patented Jan. 1, 1924.

1,479,176

UNITED STATES PATENT OFFICE.

WILLIAM N. GREEN, OF PARIS, TEXAS.

BELT CLEANER.

Application filed March 3, 1923. Serial No. 622,586.

*To all whom it may concern:*

Be it known that I, WILLIAM N. GREEN, a citizen of the United States, residing at Paris, in the county of Lamar and State of Texas, have invented certain new and useful Improvements in Belt Cleaners, of which the following is a specification, reference being had to the accompanying drawings.

This invention relates to belt cleaners for ditching and grading machines and more particularly to a device for automatically removing from the under or roller engaging surface of an elevating belt such as employed on such machines any collected dirt.

An important object of the invention is to provide a device of this character operated by the grader in its operation under the ground and so constructed that it may be readily applied to graders without in any manner altering the present construction thereof.

A further object of the invention is to provide a device of this character which thoroughly cleans the surface of the belt at each operation thereof, each stroke of the cleaner carrying the same entirely across the face of the belt to thereby insure removal of the dirt at the engaged portion of the belt.

These and other objects I attain by the structure shown in the accompanying drawings, wherein for the purpose of illustration is shown a preferred embodiment of my invention and wherein like reference characters designate like parts throughout.

In the drawings:—

Figure 1 is a sectional view showing an apparatus constructed in accordance with my invention applied to a grader;

Figure 2 is a fragmentary plan view partially in section thereof;

Figure 3 is a detailed view showing the driver for the cleaner; and

Figure 4 is a detailed fragmentary elevation showing the mounting of the cleaning block.

Referring now more particularly to the drawings, the numeral 10 indicates the belt of a combined ditcher and grader and 11 the opening formed through the roller support of the belt by means of which access is had to the under surface of the belt to clean the same. 12 indicates the drive axle which in this type of machine is connected for rotation with the drive wheels 13 in order that a drive 14 may be provided from the axle to the belt, the axle being rotatably mounted in bearings 15 carried by the body of the grader.

In accordance with my invention I secure to adjacent bearings 15 rearwardly and downwardly extending braces 16, to the lower ends of which are secured bearings 17 in which is mounted a shaft 18. The outer end of this shaft is provided with a crank 19 aligned with the opening 11 and in this opening upon the face of the belt I mount a block 20 of wood or the like of a desired size to provide proper weight. This block is connected by means of a pitman 21 with the crank 19 so that it is reciprocated across the face of the belt. To the shaft 18 I secure a sprocket wheel 22 and to the axle 12 a split sprocket 23 which by its application clamps upon the axle to be rotated thereby, these sprockets being connected by a sprocket belt 24.

By mounting the device as described I am enabled to use a relatively long shank arm 19 so that a throw of the block 20 is provided permitting the same to travel entirely across the belt at each operation of the crank, thereby insuring the forcing of any dirt carried by the inner suface of the belt through one or the other of the openings 11 at the opposite sides of the belt. I am further enabled to prevent destruction of the belt by the block 20 in event of the same meeting any rigid obstruction upon the belt because of the fact that the length of pitman thus rendered necessary is considerable and accordingly should a light pitman be employed such as a small iron rod or the like, the pitman will give and spring before any injurious effect to the belt results.

It will be obvious that a belt cleaner constructed in accordance with my invention may be readily applied to a grading machine without in any manner altering the construction thereof, and when so applied will be operated by the operation of the grader and accordingly the belt 10 will require none of the usual attention. It will furthermore be obvious that this structure is capable of some change and modification without materially departing from the spirit of my invention and I accordingly do not limit myself to such specific structure except as hereinafter claimed.

What is claimed is:—

1. The combination with a combined elevator and grader including a belt, a belt mounting having openings affording access to the inner face of the belt, an axle driven by the supporting wheels and bearings supporting the axle, of supports rigidly secured to such bearings and extending downwardly and rearwardly thereof, bearings secured to such supports adjacent the free ends thereof, a crank shaft rotatably mounted in such bearings, a block engaging the inner surface of the belt, pitman connection between the crank of the crank shaft and the block whereby the block is reciprocated when the crank shaft is rotated, a driving connection between said crank shaft and said axle.

2. The combination with a combined elevator and grader including a belt, a belt mounting having openings affording access to the inner face of the belt, an axle driven by the supporting wheels, and bearings supporting the axle, of supports rigidly secured to such bearings and extending downwardly and rearwardly thereof, bearings secured to such supports adjacent the free ends thereof, a crank shaft rotatably mounted in such bearings, a block engaging the inner surface of the belt, pitman connection between the crank of the crank shaft and the block whereby the block is reciprocated when the crank shaft is rotated, a driving connection between said crank shaft and said axle, including a sprocket gear secured to such crank shaft, a split sprocket clampingly applied to the axle, and a sprocket chain connecting said sprockets.

In testimony whereof I hereunto affix my signature.

WILLIAM N. GREEN.